US008717669B2

(12) United States Patent
Zhu et al.

(10) Patent No.: US 8,717,669 B2
(45) Date of Patent: May 6, 2014

(54) APPARATUS AND METHOD OF GENERATING NEARLY NON-DIFFRACTING BEAMS FROM MULTIMODE OPTICAL FIBERS

(75) Inventors: Xiushan Zhu, Tucson, AZ (US); Axel Schulzgen, Winter Park, FL (US); Nasser Peyghambarian, Tucson, AZ (US)

(73) Assignee: The Arizona Board of Regents, Tucson, AZ (US)

( * ) Notice: Subject to any disclaimer, the term of this patent is extended or adjusted under 35 U.S.C. 154(b) by 187 days.

(21) Appl. No.: 13/124,582

(22) PCT Filed: Oct. 14, 2009

(86) PCT No.: PCT/US2009/060689
§ 371 (c)(1),
(2), (4) Date: May 31, 2011

(87) PCT Pub. No.: WO2010/045366
PCT Pub. Date: Apr. 22, 2010

(65) Prior Publication Data
US 2011/0235166 A1    Sep. 29, 2011

Related U.S. Application Data

(60) Provisional application No. 61/196,447, filed on Oct. 17, 2008.

(51) Int. Cl.
*G02B 6/28* (2006.01)
(52) U.S. Cl.
USPC ......................................... 359/341.1; 385/28
(58) Field of Classification Search
USPC ............................... 359/341.1; 385/28, 95, 96
See application file for complete search history.

(56) References Cited

U.S. PATENT DOCUMENTS

| 6,222,960 | B1 * | 4/2001 | Stensland et al. ............... 385/28 |
| 2002/0145728 | A1 * | 10/2002 | Adams et al. ................... 356/72 |
| 2002/0150333 | A1 | 10/2002 | Reed et al. |
| 2002/0191911 | A1 | 12/2002 | Ukrainczyk |
| 2005/0147369 | A1 | 7/2005 | Shang |
| 2005/0163426 | A1 * | 7/2005 | Fermann et al. ................ 385/37 |
| 2007/0206912 | A1 * | 9/2007 | Minelly et al. ................ 385/124 |
| 2009/0257711 | A1 * | 10/2009 | Ramachandran ............... 385/28 |

FOREIGN PATENT DOCUMENTS

JP          07261027 A  *  10/1995  .............. G02B 6/00

OTHER PUBLICATIONS

Mohammed et al. "Wavelength Tunable Fiber Lens Base on Multimode Interference", Journal of Lightwave Technology, vol. 22, No. 2, pp. 469-477 (2004).*
Zhu et al. "Single-Transverse-Mode Output from a Fiber Laser on Multimode Interference", Optics Letters, vol. 33, No. 9, pp. 908-910, May 1, 2008.*
Johnson et al., "Wavelength Tunable Fiber Lens Based on Multimode Interference," *Journal of Lightwave Technology, IEEE Service Center*, New York, vol. 22, No. 2, Feb. 1, 2004, p. 469.
Zhu et al., "Single-Traverse-Mode Output from a Fiber Laser on Multimode Interference," *Optics Letters Optical Society of America*, vol. 33, No. 9, May 1, 2008, Abstract, pp. 908-910.

* cited by examiner

*Primary Examiner* — Eric Bolda
(74) *Attorney, Agent, or Firm* — Davis Wright Tremaine LLP

(57) ABSTRACT

A first optical fiber (12) having a first end and a second end is connected to a multimode second optical fiber (14) at the second end. The first optical fiber (12) outputs a substantially single mode optical beam at its second end. The multimode second optical fiber (14) converts light in the optical beam of single mode from the first optical fiber to light of multiple modes, and provides an output beam that has less diffractive spreading than that of a Gaussian beam.

17 Claims, 11 Drawing Sheets n=1 n=2 n=3 n=4 n=5 n=6

Index Profile of an Annular Cored Fiber

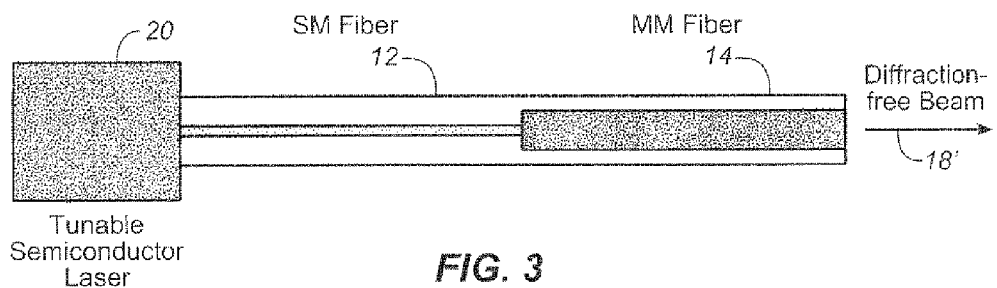
FIG. 3
50 μm Multimode Fiber
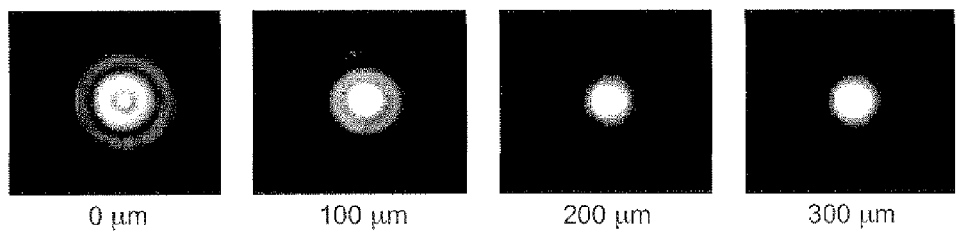
| 0 μm | 100 μm | 200 μm | 300 μm |
| --- | --- | --- | --- |
| FIG. 4A | FIG. 4B | FIG. 4C | FIG. 4D |
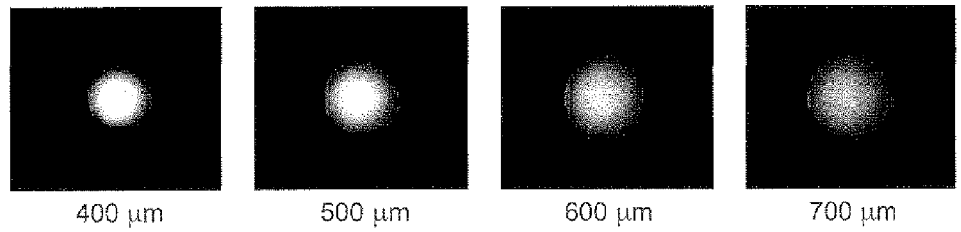
| 400 μm | 500 μm | 600 μm | 700 μm |
| --- | --- | --- | --- |
| FIG. 4E | FIG. 4F | FIG. 4G | FIG. 4H |
SMF-28 Single-mode Fiber
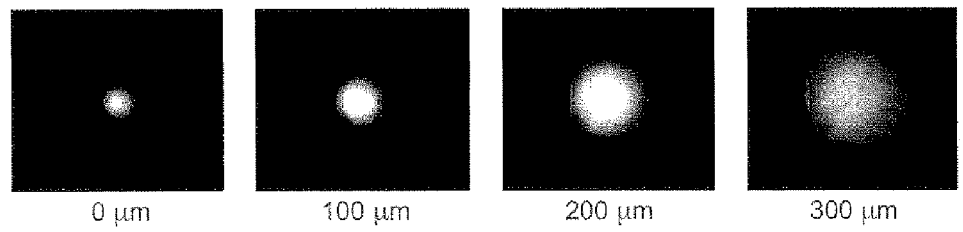
| 0 μm | 100 μm | 200 μm | 300 μm |
| --- | --- | --- | --- |
| FIG. 4I | FIG. 4J | FIG. 4K | FIG. 4L |

0 μm

50 μm

100 μm

150 μm

200 μm

250 μm

300 μm

350 μm

400 μm

450 μm

500 μm

550 μm

0 μm

50 μm

100 μm

150 μm

200 μm

250 μm

300 μm

350 μm

400 μm

450 μm

500 μm

550 μm

600 μm

650 μm

700 μm

750 μm

0 μm  50 μm  100 μm  150 μm  200 μm

250 μm  300 μm  350 μm  400 μm  450 μm

500 μm  550 μm  600 μm  650 μm  700 μm

750 μm  800 μm  850 μm  900 μm  950 μm

0 μm

100 μm

200 μm

300 μm

400 μm

500 μm

600 μm

700 μm

800 μm

900 μm

1000 μm

1250 μm

1500 μm

1750 μm

2000 μm

0 μm

100 μm

200 μm

300 μm

400 μm

500 μm

750 μm

1000 μm

1250 μm

1500 μm

1750 μm

2000 μm

2250 μm

2500 μm

3000 μm

APPARATUS AND METHOD OF GENERATING NEARLY NON-DIFFRACTING BEAMS FROM MULTIMODE OPTICAL FIBERS

CROSS-REFERENCE TO RELATED APPLICATIONS

This application claims the benefit of the priority U.S. Provisional Patent Application Ser. No. 61/196,447, filed Oct. 17, 2008, which application is incorporated herein in its entirety by reference as if fully set forth herein.

This invention was made with government support under Grant/Contact Number ECS0725479 awarded by National Science Foundation. The government has certain rights in the invention.

BACKGROUND

This invention relates in general to systems and methods for generating optical beams and in particular to systems and methods for generating nearly non-diffracting optical beams.

Any field of wavelength X initially confined to a finite area of radius r in a transverse plane will be subject to diffractive spreading as it propagates outward from that plane into free space. The diffractive spreading becomes increasingly noticeable at distances beyond the Rayleigh range of scale $r^2/\lambda$. Diffraction sets a limit that makes it impossible to simultaneously obtain a beam with very narrow waist (r is very small) and a long non-diffracting propagation distance (longer than the Rayleigh range). Although this limit holds for most beam shapes including Gaussian beams, Durnin showed the possibility of diffraction-free beams with special field distributions, so-called Bessel beams, see, J. Durnin, "Exact solutions for nondiffracting beams. I. The scalar theory," *J. Opt. Soc. Am. A*, vol. 4, pp. 651-654, April 1987, whose central spot can be extremely narrow, on the order of one wavelength, without being subject to diffractive spreading. Bessel beams have attracted substantial interest because of their various applications such as optical acceleration, particle guiding and manipulation, nonlinear optics, optical interconnection and alignment, imaging, microfabrication, and lithography.

Axicons see, J. H. Mcleod, "The axicon: a new type of optical element," *J. Opt. Soc. Am.*, vol. 44, pp. 592-597, August 1954, G. Indebetouw, "Nondiffracting optical fields: some remarks in their analysis and synthesis," *J. Opt. Soc. Am. A*, vol. 6, pp. 150-152, 1989, are the best-known and most common tool for generating Bessel beams. But they are bulk optics, free-space elements and require careful alignment. Although microaxicons fabricated on the fiber end via chemically etching see, S. K. Eah and W. Jhe, "Nearly diffraction-limited focusing of a fiber axicon microlens," *Rev. Sci. Instrum.*, vol. 74, pp. 4969-4971, 2003, focused ion beam machining see S. Cabrini, C. Liberale, D. Cojoc, A. Carpentiero, M. Prasciolou, S. Mora, V. Degiorgio, F. De Angelis, and E. Di Fabrizio, "Axicon lens on optical fiber forming optical tweezers, made by focused ion beam milling," *Microelectron. Eng.* Vol. 83, pp. 804-807, 2006, and mechanically polishing see, T. Grosjean, S. S. Saleh, M. A. Suarez, I. A. Ibrahim, V. Piquerey, D. Charraut., and P. Sandoz, "Fiber microaxicons fabricated by a polishing technique for the generation of Bessel-like beams," *Appl. Opt*, vol. 46, pp. 8061-8067, November 2007, can overcome the disadvantages of bulk axicons and offer the possibility of producing Bessel-like beams with a compact fiber device, their manufacturing process is costly, complicated, and difficult to control. Very recently, Ramachandran see, S. Ramachandran and S. Ghalmi, "Diffraction-free, self-healing Bessel beams from fibers," in Conference on Lasers and Electro-Optics/Quantum Electronics and Laser Science conference, San Jose, 2008, CPDB5, demonstrated a novel method to generate Bessel-like beam from an optical fiber with a long-period fiber Bragg grating inscribed into its core. The beam shape, however, is strongly wavelength-dependent and special equipment is needed to fabricate the grating.

It s therefore desirable to provide improved systems and methods for generating nearly non-diffracting optical beams with better characteristics. The standard by which the characteristics of nearly non-diffracting optical beams is measured is by comparison to a Gaussian beam.

SUMMARY

In one embodiment of the invention, a first optical fiber having a first end and a second end is connected to a multimode second optical fiber at the second end. The first optical fiber outputs a substantially single mode optical beam at its second end. The multimode second optical fiber converts light in the single mode optical beam from the first optical fiber to light of multiple modes, and provides an output beam that has less diffractive spreading than that of a Gaussian beam.

In another embodiment of the invention, a structure is provided comprising a first optical fiber having a first end and a second end spliced to a multimode second optical fiber at the second end. A light beam is supplied to the first end of the first optical fiber so that the first optical fiber outputs a substantially single mode optical beam at its second end to the multimode second optical fiber. The single mode optical beam is converted to light of multiple modes by the multimode second optical fiber, which thereby provides an output beam that has less diffractive spreading than that of a Gaussian beam.

Here, we present the invention of an extremely simple and low-cost method to generate non-diffractive beams from optical fibers. In contrast to any previously demonstrated device, the beam generated from our invented fiber devices has a narrower and brighter central spot that also can be easily manipulated.

All patents, patent applications, articles, books, specifications, other publications, documents and things referenced herein are incorporated by reference herein in their entireties as if set forth fully herein.

BRIEF DESCRIPTION OF THE DRAWINGS

FIG. 3 is a schematic view of an optical fiber structure and a tunable light source useful for illustrating another embodiment of the invention.

FIGS. 4A-4H are intensity profiles of the beam coming from a 50 μm MM fiber in the optical fiber structure of FIG. 3 at selected distances from the fiber facet.

FIGS. 4I-4L are intensity profiles of the beam coming from a SMF-28 fiber at selected distances from the fiber facet, for comparison with those of FIGS. 4A-4H to illustrate the reduced diffractive spreading achieved by the optical fiber structure of FIGS. 1 and 3 (with 50 μm MM fiber) compared to the diffractive spreading of the beam from a SMF-28 fiber.

For convenience in description, identical components are labeled by the same numbers in this application.

DETAILED DESCRIPTION

Figure 1:
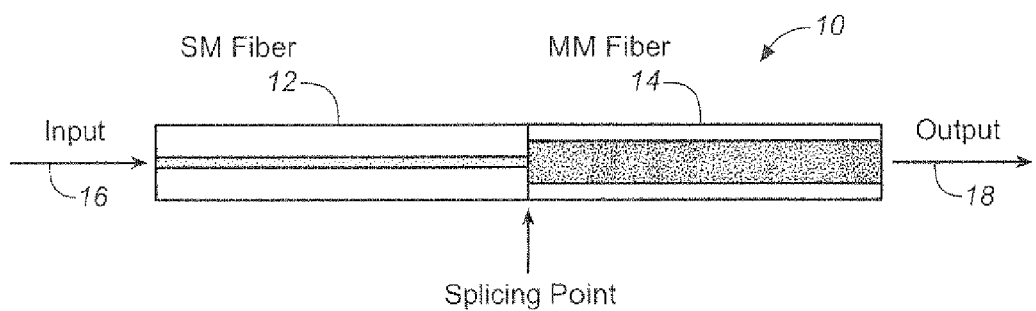
FIG. 1 is a schematic view of an optical fiber structure comprising a single mode fiber (SMF) and a multimode (MM) fiber useful for illustrating one embodiment of the invention.

In a first embodiment, a simple and compact fiber device 10 fabricated by directly splicing a single-mode (SM) fiber 12 onto a short-piece of large-core multimode (MM) fiber 14, as shown in FIG. 1, is proposed and demonstrated to achieve at least some of the advantages of this invention. The output end of the single-mode (SM) fiber 12 is spliced onto an input end of multimode (MM) fiber 14. The splicing is done in a conventional manner, such as by fusion or mechanical splicing, so that such techniques are known and need not be described herein. An optical beam 16 is supplied to an input end of the single-mode (SM) fiber 12 from an optical source (not shown), and a $LP_{0,1}$ mode (the fundamental mode) is carried by fiber 12. Due to the mode orthogonality, only $LP_{0,n}$ modes are excited in the MM fiber segment 14 when the input field (SM field) to the MM fiber segment 14 is a $LP_{0,1}$ mode (the fundamental mode) of a SM fiber. The fields of the $LP_{0,n}$ modes in the MM fiber core are represented by apertured Bessel functions of zero-th order. Therefore, the output beam 18 from the MM fiber is the superposition of Bessel-like beams. The fields of the $LP_{0,n}$ modes in the MM fiber core interfere to provide a beam that has less diffractive spreading that a Gaussian beam.

Figure 2A:
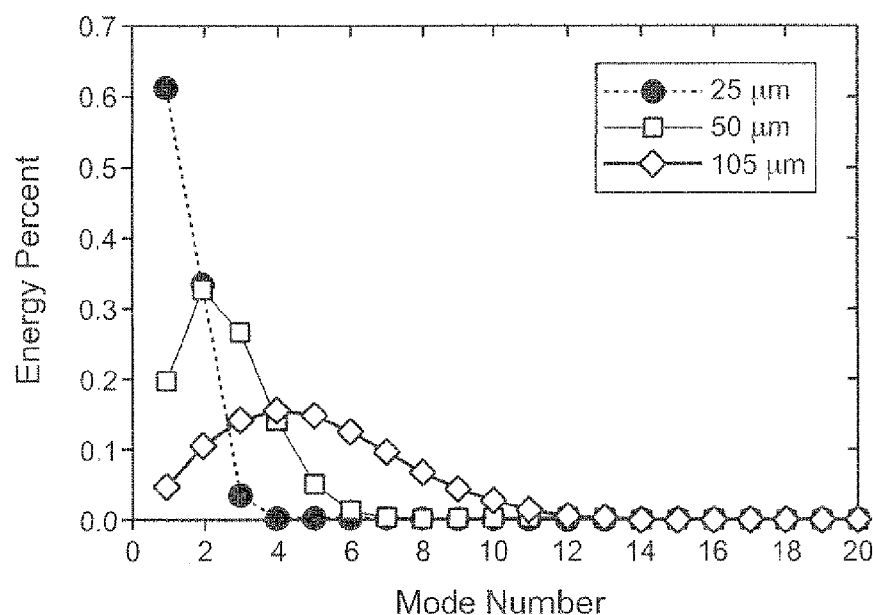
FIG. 2A is a graphical plot of percentages of the power coupled from the fundamental mode of a SMF-28 fiber to LP0,n modes of the MM fiber with different core sizes to illustrate the operation of the optical fiber structure of FIG. 1.
Figure 2B:
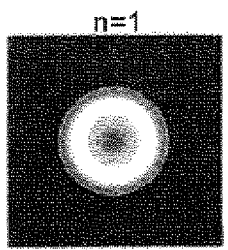
FIGS. 2B-2G are the intensity profiles of the first six LP0,n modes in a MM fiber with 105 μm core diameter in the optical fiber structure of FIG. 1.
Figure 2C:
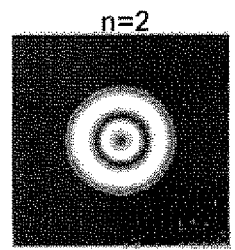
Figure 2D:
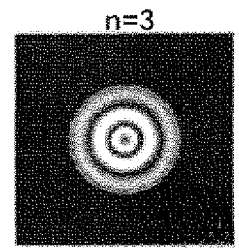
Figure 2E:
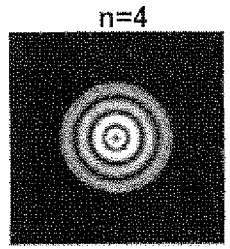
Figure 2F:
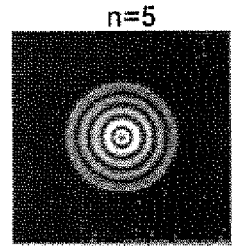
Figure 2G:
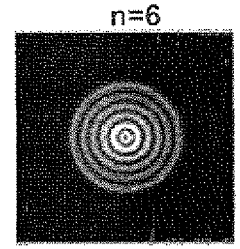

In particular, for higher order $LP_{0,n}$ modes, the mode field resembles closely a Bessel field, as shown in FIGS. 2B-2G. It is also found that the larger the core diameter of the MM fiber, the higher is the order of the excited $LP_{0,n}$ modes; see, X. Zhu, A. Schulzgen, H. Li, L. Li, L. Han, J. V. Moloney, and N. Peyghambarian, "Detailed investigation of self-imaging in large-core multimode optical fibers for application in fiber lasers and amplifiers" submitted to Optics Express. In FIG. 2A, the energy coupled into the various $LP_{0,n}$ modes is also plotted for MM fibers of different core diameters (25 μm, 50 μm and 105 μm) when the input fiber is SMF-28, a standard SM fiber used in optical communications. Therefore, when a large-core MM fiber is used in the fiber device shown in FIG. 1, most of the launched energy is coupled into higher order $LP_{0,n}$ modes and the intensity evolution along the free space propagation direction exhibits an almost diffraction-free behavior.

The unique concepts in this invention include at least the following:
1. The field of a Bessel beam is remarkably resistant to diffractive spreading and in the same way is the field of the interfering Bessel beams coming from the MM fiber segment shown in FIG. 1.
2. Only $LP_{0,n}$ modes are excited inside the MM fiber segment when the field of a SM fiber is launched.
3. The higher the order of the $LP_{0,n}$ modes, the more its field resembles a Bessel field.
4. The larger ratio of the core size between the MM fiber and the SM fiber, the more energy is coupled into the higher $LP_{0,n}$ modes.
5. This fiber device is extremely simple and compact compared to other bulk elements generating diffraction-free beams.
6. This fiber device is flexible and easy to fabricate compared to other fiber devices generating diffraction-free beams.
7. The field from the MM fiber segment is an interference of the fields of the $LP_{0,n}$ modes, therefore, the intensity evolution of the output beam can be controlled by changing the length of the MM fiber segment or the wavelength of the input signal, or both.

8. The FWHM (full width half maximum) of the central spot can be much smaller than that of the input SM field.
9. The peak intensity of the central spot can be much larger than that of the input SM field.
10. Laguerre-Gaussian beams can also be generated from this fiber device.
11. The MM fiber segment can be a rare-earth-doped active fiber and can work not only as a $LP_{0,n}$ modes interferometer but also as a fiber amplifier to increase the intensity of the output beam.
12. In addition to the MM fiber, the SM fiber or both fibers can be an active fiber that enables light amplification.
13. The destructive zero-intensity of the beam center at some positions along the propagation direction can be avoided by using a broad-band light source.
14. A diffraction-free white light beam can be generated by use of a visible broad-band light source and a SM fiber for visible wavelengths.
15. The launched individual mode from the input fiber is not restricted to the fundamental $LP_{0,1}$ mode and can also be any other higher $LP_{0,n}$ mode.
16. The MM fiber can be specially designed to couple much more power to higher $LP_{0,n}$ modes or filter out the lower $LP_{0,n}$ modes.

Figure 2H:
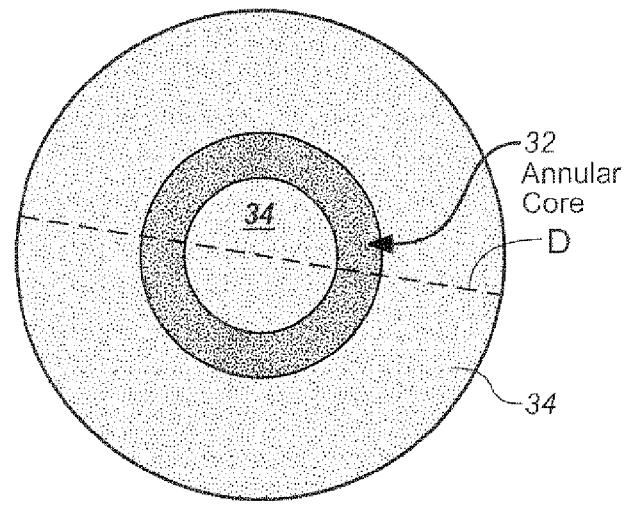
FIG. 2H is a cross-sectional view of an optical fiber that can be used to deliver a dount-shaped field to a MM fiber to illustrate another embodiment of the invention.
Figure 2I:
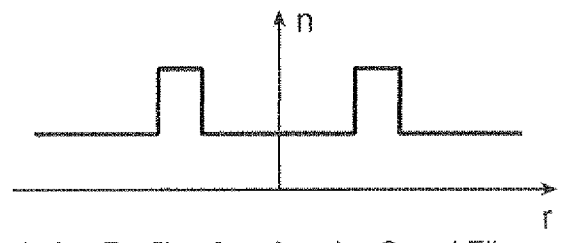
FIG. 2I is a graphical plot of the refractive index of the fiber core material and of the cladding material across a diameter of the fiber of FIG. 2H.

The fiber delivering the single mode field input to fiber 14 need not be a single mode fiber such as fiber 12, but can be a multimode fiber as well, and the single mode field input to fiber 14 need not be the fundamental mode, but can be a higher mode. In response to this higher mode input field, fiber 14 also generates multiple modes that interfere to provide a beam that has less diffractive spreading that a Gaussian beam. For delivering a higher mode field to fiber 14, the input delivery fiber preferably has an annular core, such as illustrated in cross-section in FIG. 2H. FIG. 2H is a cross-sectional view of an optical fiber that can be used to deliver a donut-shaped field to a MM fiber to illustrate another embodiment of the invention. As shown in FIG. 2H, the fiber core 32 has an annular shape that surrounds and is surrounded by a cladding material 34, where the refractive index of the fiber core material is higher than that of the cladding material as illustrated in FIG. 2I. FIG. 2I is a graphical plot of the refractive index of the fiber core material and of the cladding material across a diameter D of the fiber of FIG. 2H.

As noted above, the $LP_{0,n}$ modes are generated by the MM fiber 14 in response to a single mode field input of a fundamental or higher mode. These modes interfere to produce an interference pattern at the output beam 18. The manner in which these modes interfere will depend on the length of the fiber 14 and the wavelength of the input signal. By controlling the length of the fiber 14 or the wavelength of the input signal, or both, desirable interference pattern can be produced at the output beam 18. It is, of course, easier to control the wavelength of the input signal than the length of the MM fiber 14, as a practical matter, as described below.

Fiber Device Generating Controllable Diffraction-Free Beams

The design and experimental setup of a fiber device generating diffraction-free beams is schematically shown in FIG. 3. As in FIG. 1, large-core MM fiber 14 is spliced to a passive SM fiber 12 that is connected to a tunable single-frequency semiconductor laser 20 with a wavelength tuning range from preferably 1456 nm to 1584 nm as the signal source. The MM fiber segment 14 is preferably kept straight to avoid random mode-conversion. To measure lateral intensity distributions at various distances from the MM fiber facet, the generated beam was magnified by an aspheric lens with a numerical aperture (NA) of 0.5 and a focal length of 8 mm (Thorlabs, C240TME-C) and the profiles were recorded by an infrared CCD camera (Electrophysics, Model 7290 A). Because the opening aperture of the imaging lens is 8 mm and its NA is much larger than that of the MM fiber (NA=0.2), affect of the optical aberrations produced by the lens on the reconstruction of Bessel beams onto the CCD camera is negligible.

The principle of the fiber device shown in FIG. 1 can be described as follows: The fundamental $LP_{0,1}$ mode $[E_{in}(r,\phi)]$ of the SM fiber 12 is coupled to the MM fiber 14 where $LP_{0,n}$ modes (n is the radial index) are excited exclusively due to mode orthogonality and on-axis excitation. Mathematically, the fields of the $LP_{0,n}$ modes in the MM fiber core (some are shown in the FIGS. 2B-2G) are represented by apertured Bessel functions $J_0(k_{z,fn}r)$ with different transverse wave vectors, $k_{z,fn}=(n_f^2 k^2 - \beta_{fn}^2)^{1/2}$. Here, $k=2\pi/\lambda$, $n_f$ is the refractive index of the fiber core, and $\beta_{fn}$ is the propagation constant of the $LP_{0,n}$ mode, respectively; r is the radial coordinate and smaller than the core radius of the MM fiber R. Because each $LP_{0,n}$ mode propagates along the waveguide independently with its own propagation constant, the field at the output facet of the MM fiber is the superposition of Bessel-like fields $$E_{out}=(r,L)=\sum_{n=1}^{N} C_n J_0(k_{z,fn}r)e^{i\beta_{fn}L}, \quad r \leq R, \quad (1)$$

where L is the length of the MM fiber segment, N is the number of the excited modes in the MM fiber segment, and $C_n$ are the decomposition coefficient that can be obtained by $$C_n = \frac{\iint_S E_{in}(r,\phi) \times J_0^*(k_{z,fn}r)ds}{\iint_S |J_0(k_{z,fn}r)|^2 ds}. \quad (2)$$

Ignoring the Fresnel reflection at the MM fiber facet, the Bessel fields propagating in free space after leaving the fiber 14 can be approximated as $$E_{fs}(r,z) = \sum_{n=1}^{N} C_n J_0(k_{z,n}r)e^{i\left(\sqrt{k^2-k_{z,n}^2}\,z+\beta_{fn}L\right)}, \quad (3)$$

with $k_{z,n}=k_{z,fn}$. As a consequence of the superposition of multiple Bessel fields, the propagation of the beam 18 can be almost diffraction-free and special beam patterns can be generated at certain axial regions. It should be pointed out that while Eq. 3 is a good approximation for the central propagation-invariant field, the entire field should be obtained from the field $E_{out}(r,L)$ using diffraction theory.

In the design of this fiber device, a large ratio of the core diameter between the MM fiber and the SM fiber is beneficial for a long non-diffracting propagation distance. Note that, by tuning the wavelength of the single-frequency signal by tuning laser 20, the behavior of the diffraction-free beams can be controlled.

Some Experimental Results

Some experimental results obtained from the operation of the device 20 in FIG. 3 are shown in FIGS. 4A-9. Obviously, for the output beam coming from the SMF-28 fiber alone (not shown), the peak intensity reduces to a half value after propagating less than 100 μm as a consequence of diffraction as shown in FIGS. 4I-4L and FIG. 9. However, for the output beams 18' coming from the MM fiber 14, the peak intensity of the central spot can be maintained above half of maximum value for propagation distances much longer than 100 μm. Moreover, the evolution of the intensity profiles for signals with different wavelengths exhibit different behavior. That enables control over the intensity distribution at a given plane. Laguerre-Gaussian modes can also be formed at some planes. FIGS. 4I-4L are intensity profiles of the output beam coming from a single SMF-28 fiber at selected distances from the fiber facet, for comparison with those of FIGS. 4A-4H to illustrate the reduced diffractive spreading of beams 18 and 18' achieved by the optical fiber structure of FIGS. 1 and 3 (with 50 μm MM fiber) compared to the diffractive spreading of the beam from a SMF-28 fiber.

Figure 5:
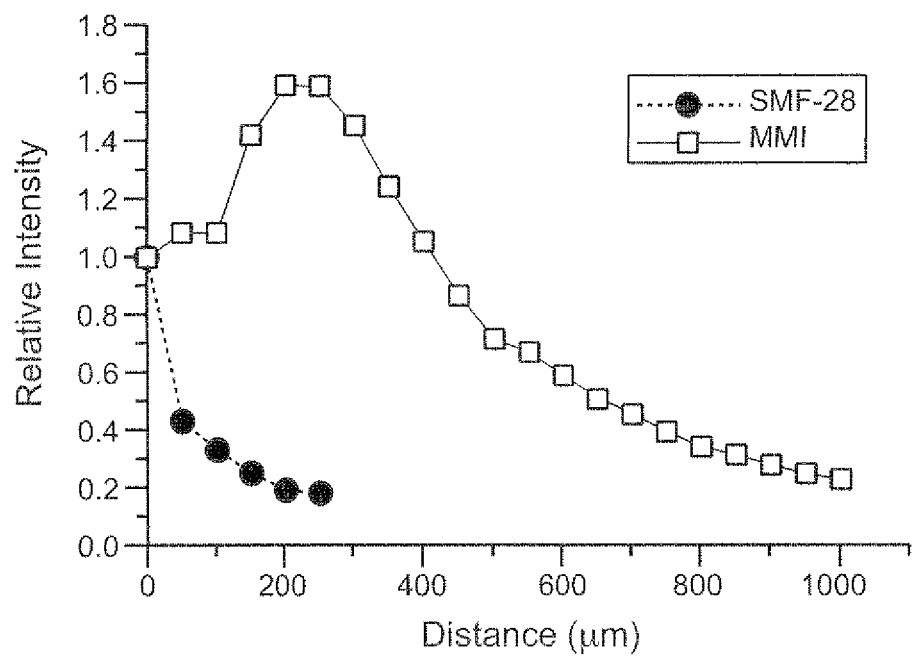
FIG. 5 is a graphical plot of peak intensities of the central spot with respect to the distances from the fiber facet for the beam coming from a 50 μm MM fiber (square) in the optical fiber structure of FIGS. 1 and 3, and that from a SMF-28 fiber (circle), respectively, to illustrate the reduced diffractive spreading achieved by the optical fiber structure of FIGS. 1 and 3 compared to that of a SMF-28 fiber.
Figure 6A:
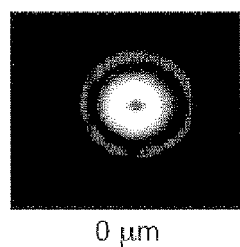
FIGS. 6A-6L are intensity profiles of the beam coming from a 50 μm MM fiber in the optical fiber structure of FIG. 3 at selected distances from the fiber facet when the MM fiber segment is 5 cm long and the input signal wavelength is 1545 nm.
Figure 6B:
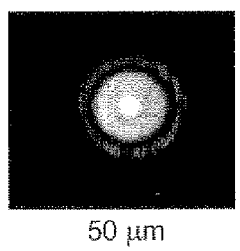
Figure 6C:
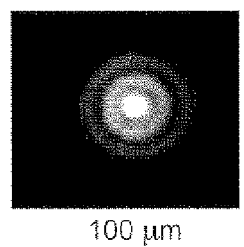
Figure 6D:
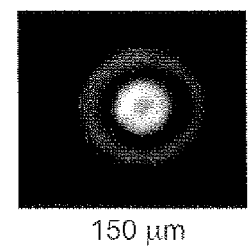
Figure 6E:
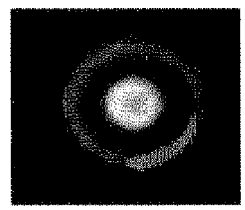
Figure 6F:
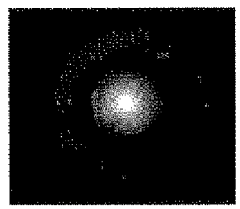
Figure 6G:
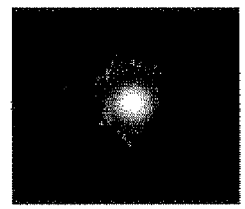
Figure 6H:
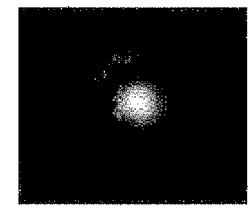
Figure 6I:
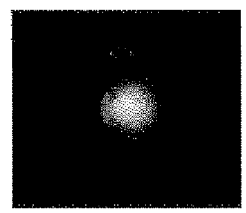
Figure 6J:
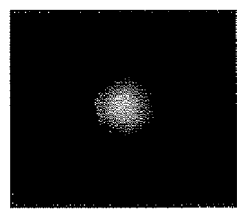
Figure 6K:
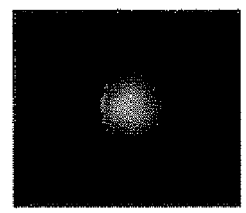
Figure 6L:
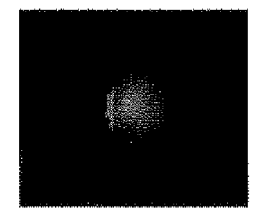

FIG. 5 is a graphical plot of peak intensities of the central spot with respect to the distances from the fiber facet for the beam coming from a 50 μm MM fiber (square) in the optical fiber structure of FIGS. 1 and 3 and that from a SMF-28 fiber (circle), respectively, to illustrate the reduced diffractive spreading achieved by the optical fiber structure of FIGS. 1 and 3 compared to that of a SMF-28 fiber.

FIGS. 6A-6L are intensity profiles of the beam 18' coming from a 50 μm MM fiber in the optical fiber structure of FIG. 3 at selected distances from the fiber facet when the MM fiber segment is 5 cm long and the input signal wavelength is 1545 nm.

Figure 7A:
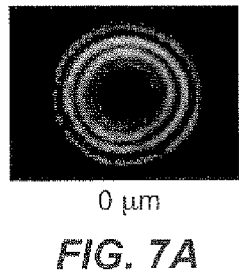
FIGS. 7A-7P are intensity profiles of the beam coming from a 105 μm MM fiber in the optical fiber structure of FIG. 3 at selected distances from the fiber facet when the MM fiber segment is 4.3 cm long and the input signal wavelength is 1560 nm.
Figure 7B:
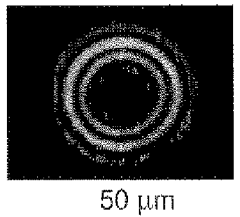
Figure 7C:
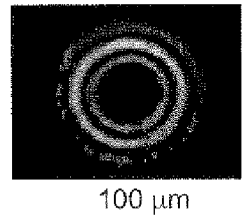
Figure 7D:
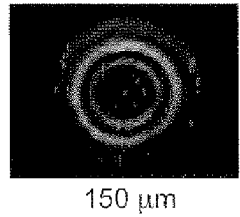
Figure 7E:
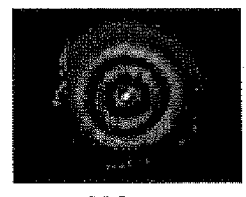
Figure 7F:
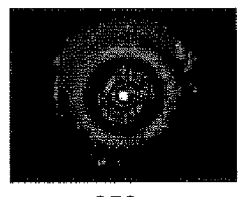
Figure 7G:
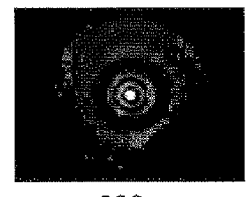
Figure 7H:
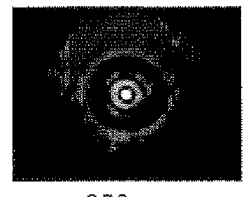
Figure 7I:
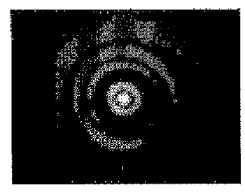
Figure 7J:
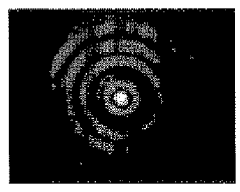
Figure 7K:
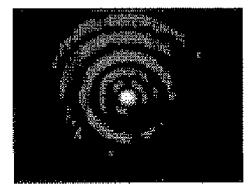
Figure 7L:
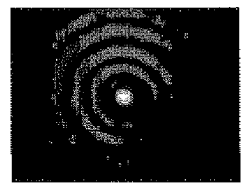
Figure 7M:
Figure 7N:
Figure 7O:
Figure 7P:

FIGS. 7A-7P are intensity profiles of the beam 18' coming from a 105 μm MM fiber in the optical fiber structure of FIG. 3 at selected distances from the fiber facet when the MM fiber segment is 4.3 cm long and the input signal wavelength is 1560 nm.

Figures 8A, 8B, 8C, 8D, 8E:
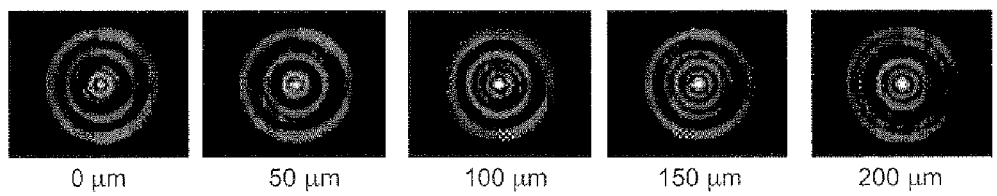
FIGS. 8A-8T are intensity profiles of the beam coming from a 105 μm MM fiber in the optical fiber structure of FIG. 3 at selected distances from the fiber facet when the MM fiber segment is 4.3 cm long and the input signal wavelength is 1580 nm.
Figures 8F, 8G, 8H, 8I, 8J:
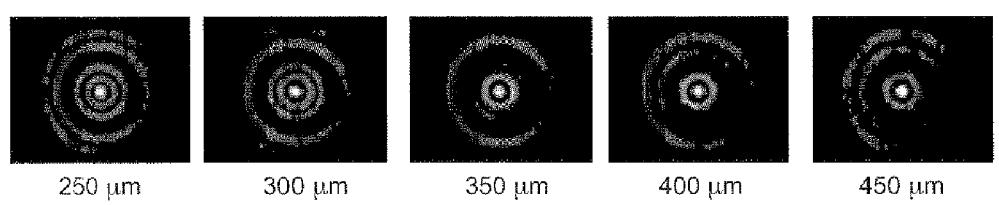
Figures 8K, 8L, 8M, 8N, 8O:
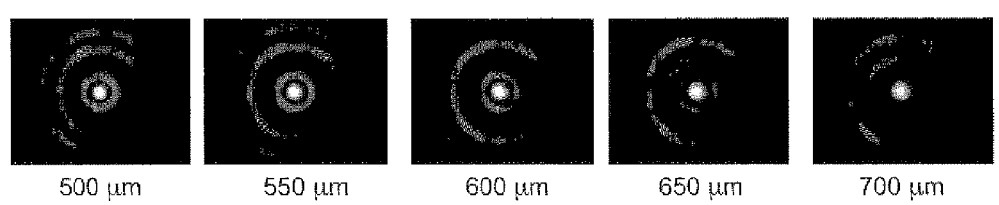
Figures 8P, 8Q, 8R, 8S, 8T:
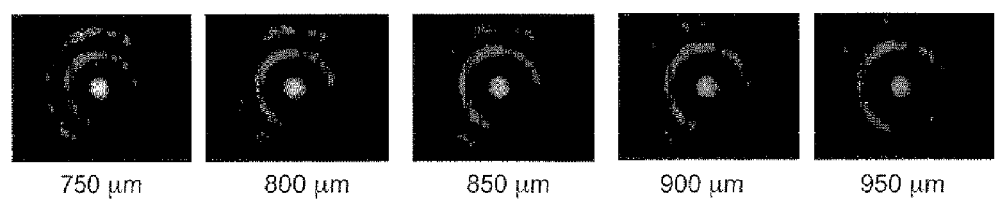

FIGS. 8A-8P are intensity profiles of the beam 18' coming from a 105 μm MM fiber in the optical fiber structure of FIG. 3 at selected distances from the fiber facet when the MM fiber segment is 4.3 cm long and the input signal wavelength is 1580 nm.

Figure 9:
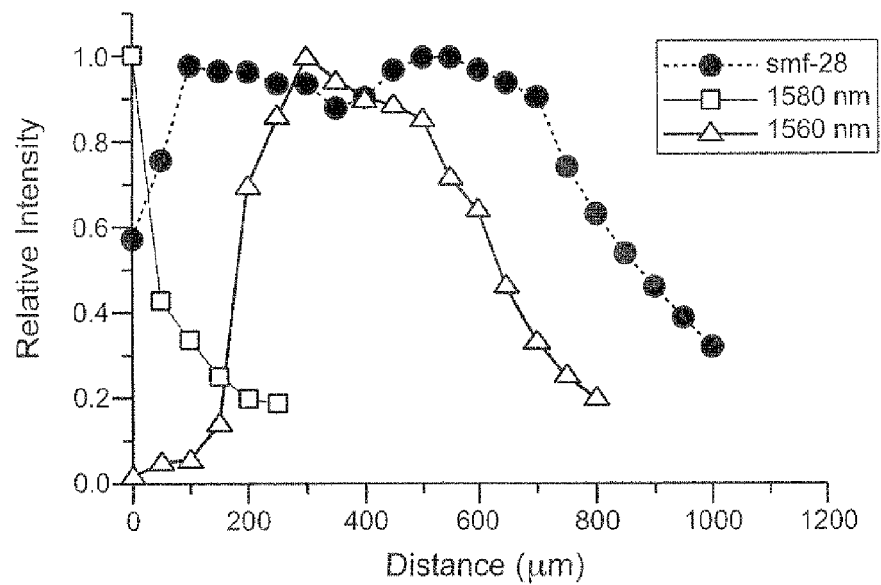
FIG. 9 is a graphical plot of peak intensities of the central spot with respect to the distances from the fiber facet for the beam coming from a 105 μm MM fiber in the optical fiber structure of FIG. 3 for signal wavelengths of 1560 and 1580 nm, and that from a SMF-28 fiber, respectively.

FIG. 9 is a graphical plot of peak intensities of the central spot with respect to the distances from the fiber facet for the beam coming from a 105 μm MM fiber in the optical fiber structure of FIG. 3 for signal wavelengths of 1560 and 1580 nm, and that from a SMF-28 fiber, respectively.

Fiber Device Generating White-Light Diffraction-Free Beams

Figure 10:
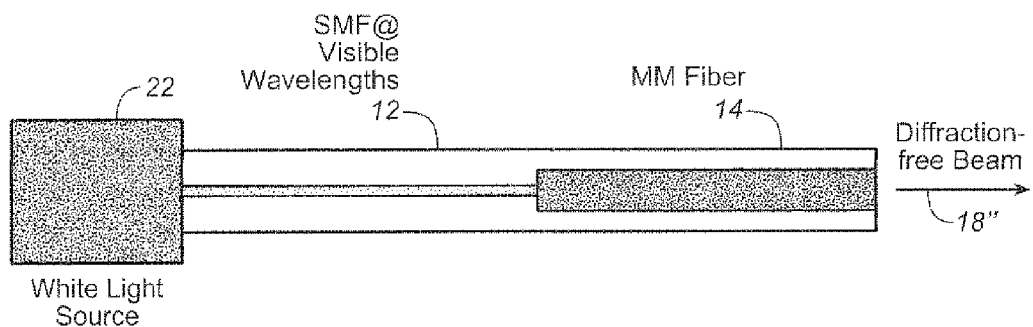
FIG. 10 is a schematic view of an optical fiber structure and a white light source useful for illustrating yet another embodiment of the invention.

The input signal into the fiber devices of this application can also be broadband visible light and, in this way, a diffraction-free white-light beam can be generated. The design of a fiber generating white-light diffraction-free beams is shown in FIG. 10. A small-core SM fiber 12 for visible wavelengths is connected to a white light source 22 and is spliced to a MM fiber 14. The intensity profiles of output beam 18" at selected distances from the MM fiber facet are shown in FIGS. 11A-11O and 12A-12O for MM fibers with core diameters of 50 μm and 105 μm, respectively.

Figure 11A:
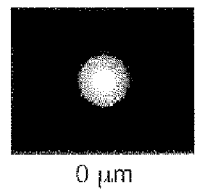
FIGS. 11A-11O are intensity profiles of the white light beam coming from a 50 μm MM fiber in the optical fiber structure of FIG. 10 at selected distances from the fiber facet when the MM fiber segment is 5 cm long.
Figure 11B:
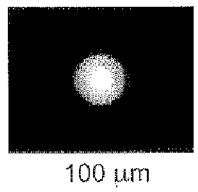
Figure 11C:
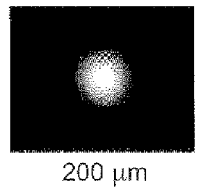
Figure 11D:
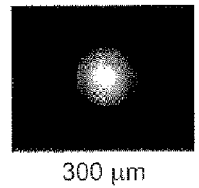
Figure 11E:
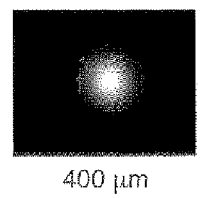
Figure 11F:
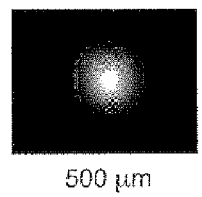
Figure 11G:
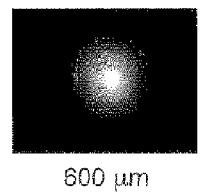
Figure 11H:
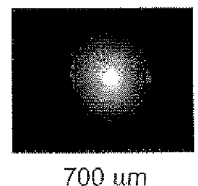
Figure 11I:
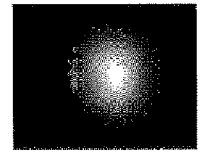
Figure 11J:
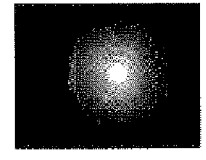
Figure 11K:
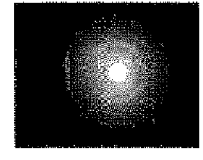
Figure 11L:
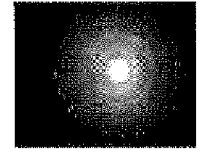
Figure 11M:
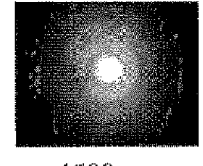
Figure 11N:
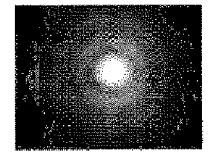
Figure 11O:
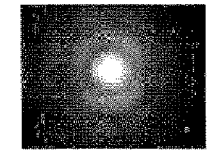

FIGS. 11A-11O are intensity profiles of the white light beam 18" coming from 50 μm MM fiber 14 in the optical fiber structure of FIG. 10 at selected distances from the fiber facet when the MM fiber segment is 5 cm long.

Figure 12A:
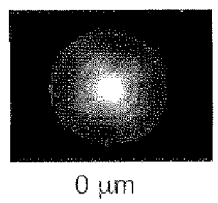
FIGS. 12A-12O are intensity profiles of the white light beam coining from a 105 μm MM fiber in the optical fiber structure of FIG. 10 at selected distances from the fiber facet when the MM fiber segment is 3 cm long.
Figure 12B:
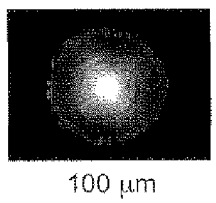
Figure 12C:
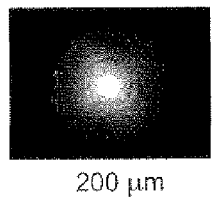
Figure 12D:
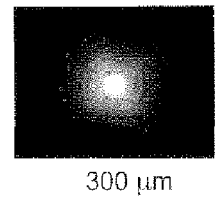
Figure 12E:
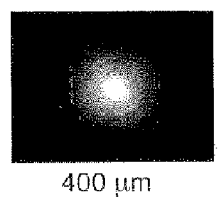
Figure 12F:
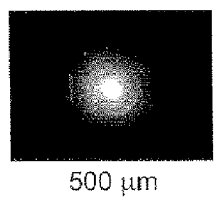
Figure 12G:
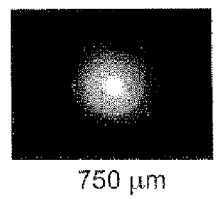
Figure 12H:
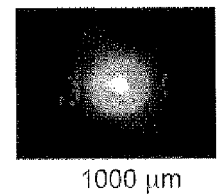
Figure 12I:
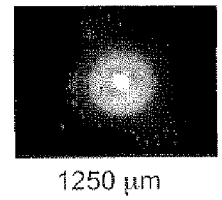
Figure 12J:
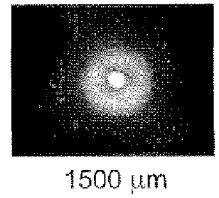
Figure 12K:
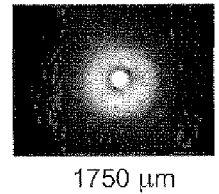
Figure 12L:
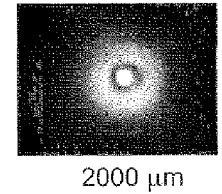
Figure 12M:
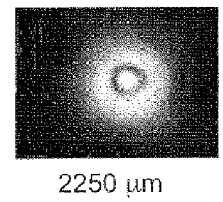
Figure 12N:
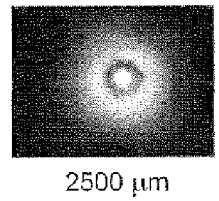
Figure 12O:
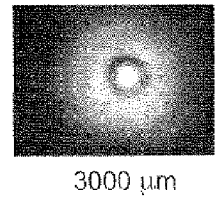

FIGS. 12A-12O are intensity profiles of the white light beam 18" coining from a 105 μm MM fiber 14 in the optical fiber structure of FIG. 10 at selected distances from the fiber facet when the MM fiber segment is 3 cm long.

Fiber Device Generating High-Power Diffraction-Free Beams

In general, a small-core input fiber is needed to generate a small central spot. However, when the input fiber has a small core size, the launch power will be limited accordingly. In addition to extreme simplicity and controllability, a big benefit of our invention is that the fiber segment can be active and the signal can be amplified. Therefore, high power non-diffracting beams can be obtained from the MM fiber in the designs shown in FIGS. 13-16.

Figure 13:
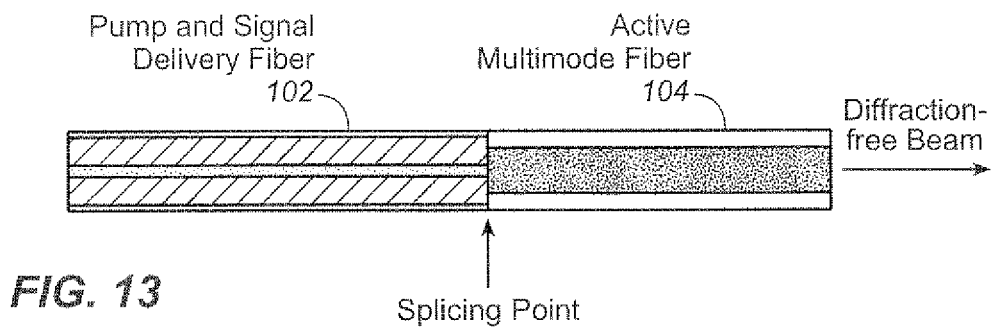
FIG. 13 is a schematic view of an optical fiber structure comprising a pump and signal delivery fiber and an active MM fiber spliced together for generating high power substantially diffraction-free beams to illustrate one more embodiment of the invention.

FIG. 13 is a schematic view of an optical fiber structure comprising a pump and signal delivery fiber and an active MM fiber spliced together for generating high power substantially diffraction-free beams to illustrate one more embodiment of the invention. Fiber 102 delivers a single mode beam as well as a pump beam to active MM fiber 104. The pump beam amplifies the beam in fiber 104. MM fiber 104 may be doped with rare earth elements to render it active.

Figure 14:
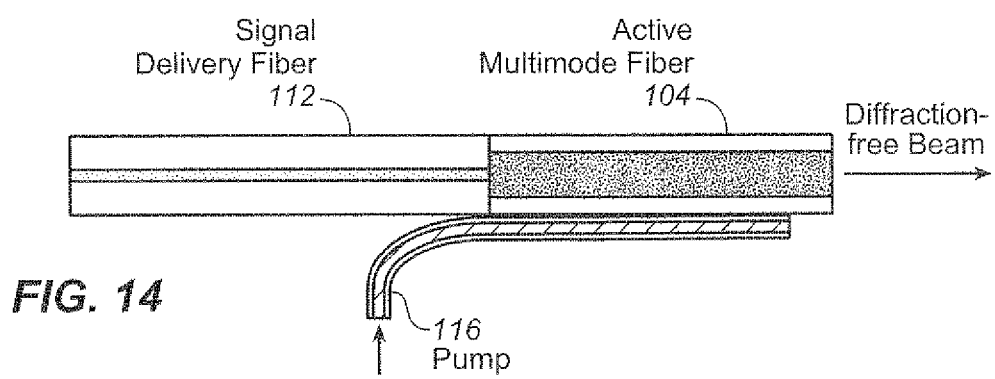
FIG. 14 is a schematic view of an optical fiber structure comprising a signal delivery fiber and an active MM fiber spliced together where the MM fiber is supplied with a pump beam for generating high power substantially diffraction-free beams to illustrate one more embodiment of the invention.

FIG. 14 is a schematic view of an optical fiber structure comprising a signal delivery fiber 112 and an active MM fiber 104 spliced together where the MM fiber is supplied with a pump beam along a pump beam channel 116 to amplify the beam in fiber 104 for generating high power substantially diffraction-free beams to illustrate one more embodiment of the invention.

Figure 15:
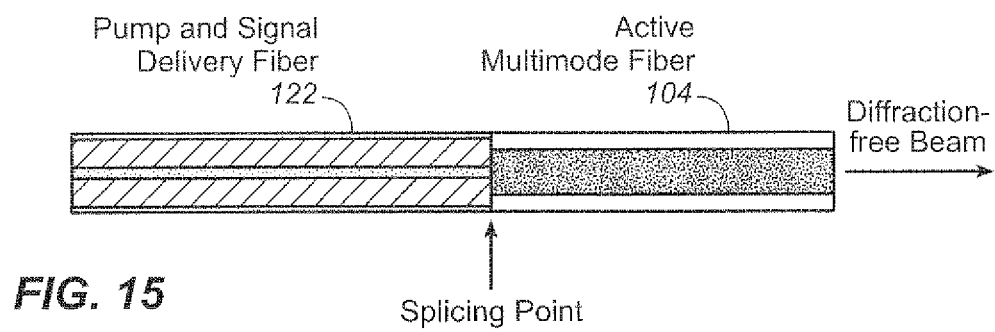
FIG. 15 is a schematic view of an optical fiber structure comprising a pump and signal delivery fiber with a double core and an active MM fiber spliced together for generating high power substantially diffraction-free beams to illustrate one more embodiment of the invention.

FIG. 15 is a schematic view of an optical fiber structure comprising a pump and signal delivery fiber 122 with a double core and an active MM fiber 104 spliced together for generating high power substantially diffraction-free beams to illustrate one more embodiment of the invention. One of the cores of fiber 122 delivers a single mode beam and is doped with a rare earth element and the other core is supplied with and carries a pump beam for amplifying the single mode beam. The pump beam in one of the cores of fiber 122 also amplifies the beam in MM fiber 104.

Figure 16:
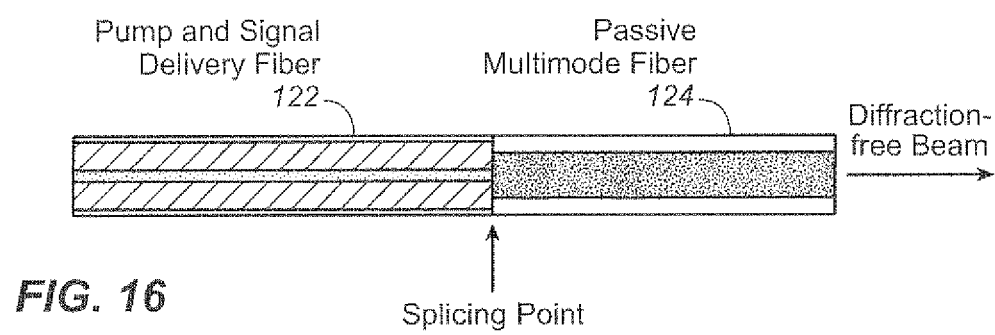
FIG. 16 is a schematic view of an optical fiber structure comprising a pump and signal delivery fiber with a double core and a passive MM fiber spliced together for generating high power substantially diffraction-free beams to illustrate one more embodiment of the invention.

FIG. 16 is a schematic view of an optical fiber structure comprising a pump and signal delivery fiber 122 with a double core and a passive MM fiber 124 spliced together for generating high power substantially diffraction-free beams to illustrate one more embodiment of the invention. One of the cores of fiber 122 delivers a single mode beam and is doped with a rare earth element and the other core is supplied with and carries a pump beam for amplifying the single mode beam.

Thus, as illustrated in FIGS. 13-16, the pump beam can be supplied either to the delivery fiber or through a separate channel alongside the MM fiber. A pump beam channel may also be employed in FIGS. 13, 15 and 16 in the manner shown in FIG. 14.

Higher order $LP_{0,n}$ modes are excited when the fundamental mode of a SM fiber is launched into a large-core MM fiber. The higher order $LP_{0,n}$ modes resemble Bessel-like field which enables the generation of beams from the MM fiber that are remarkably resistant to diffractive spreading. Compared with other technologies to obtain diffraction-free beams from optical fibers, our invention has the following advantages:

(1) Extremely easy to construct and low-cost;
(2) Power scalable;
(3) The power fraction within the central light spot can be much larger than that of a single Bessel field;
(4) The behavior of the diffraction-free beam is controllable;
(5) A very narrow central spot is possible;
(6) Diffraction-free white light beam can be generated;
(7) Other special beams may be generated due to the interference of zero-th order Bessel beams.

The invention claimed is:

1. An apparatus for generating optical beams comprising:
a first optical fiber having a first end and a second end, said first optical fiber outputting an optical beam at its second end;
an optical source supplying a beam of broad band radiation to the first end of first optical fiber; and
a multimode second optical fiber connected to said second end of the first optical fiber to convert light in the optical beam from said first optical fiber to light having multiple modes, and to provide an output beam that has less diffractive spreading than that of a Gaussian beam.

2. The apparatus of claim 1, wherein said first optical fiber comprises a single mode optical fiber.

3. The apparatus of claim 2, wherein said first optical fiber conveys light of a fundamental mode, and at least one higher mode than the fundamental mode is generated by the multimode second optical fiber.

4. The apparatus of claim 1, wherein said first optical fiber has an annular core.

5. The apparatus of claim 1, wherein said first or second optical fiber, or both, are active optical fiber or fibers that amplifies or amplify the optical beam or beams.

6. The apparatus of claim 1, further comprising at least one optical pump beam for amplifying the optical beam or beams in said first or second optical fiber, or both said first and second optical fibers.

7. The apparatus of claim 1, wherein said optical source is a white light source and first optical fiber conveys visible light.

8. A method for generating optical beams comprising:
providing a structure comprising a first optical fiber having a first end and a second end spliced to a multimode second optical fiber at said second end; and
supplying a light beam of broad band radiation to the first end of the first optical fiber so that said first optical fiber outputs an optical beam at its second end to the multimode second optical fiber, wherein the optical beam is converted to light having multiple modes, the multimode second optical fiber thereby providing an output beam that has less diffractive spreading than that of a Gaussian beam.

9. The method of claim 8, wherein said first optical fiber comprises a single mode optical fiber.

10. The method of claim 8, wherein said first optical fiber conveys light of a fundamental mode, and at least one higher mode than the fundamental mode is generated by the multimode second optical fiber.

11. The method of claim 8, wherein said first optical fiber has an annular core.

12. The method of claim 8, wherein said first or second optical fiber, or both, are active optical fiber or fibers that amplifies or amplify the optical beam or beams.

13. The method of claim 8, further comprising supplying a pumping optical beam for amplifying the optical beam or beams in said first or second optical fiber, or both said first and second optical fibers.

14. The method of claim 8, further comprising adjusting a wavelength of the optical beam supplied to the first end of first optical fiber.

15. The method of claim 8, wherein said supplying supplies white light and the first optical fiber conveys visible light.

16. The apparatus of claim 1, wherein said first optical fiber comprises a multimode optical fiber.

17. An apparatus for generating optical beams comprising:
a first optical fiber having a first end and a second end, said first optical fiber outputting a substantially single mode optical beam at its second end, said first optical fiber having an annular core or said first optical fiber being a multimode optical fiber; and
a multimode second optical fiber connected to said second end of the first optical fiber to convert light in the optical beam of said single mode from said first optical fiber to light of multiple modes, and to provide an output beam that has less diffractive spreading than that of a Gaussian beam.

* * * * *